Patented Oct. 25, 1949

2,485,638

UNITED STATES PATENT OFFICE 2,485,638

MARGARINE AND PROCESSES OF PREPARING SAME

Chester M. Gooding, Staten Island, N. Y., Hans W. Vahlteich, Englewood, N. J., and Ralph H. Neal, deceased, late of North Bergen, N. J., by Ethel Neal, administratrix, North Bergen, N. J., assignors to The Best Foods, Inc., New York, N. Y., a corporation of New Jersey No Drawing. Application December 4, 1948, Serial No. 63,622

12 Claims. (Cl. 99—122)

This application is a continuation in part of the applications S. N. 608,101 filed July 31, 1945, S. N. 608,102 filed July 31, 1945, S. N. 608,380 filed August 1, 1945 and S. N. 747,848 filed May 13, 1947.

This invention relates to margarine and more particularly to improved margarine which possesses marked moisture retention characteristics, and which, in addition to its use as a bread spread, may be employed for a wide variety of cooking and baking purposes.

An object of this invention is to retain a material amount of milk moisture in margarine and to prevent the exudation of moisture therefrom.

Another object of this invention is to prevent the so-called weeping of margarine and butter.

Another object of this invention is simultaneously to prevent substantially the exudation of milk moisture from margarine and to retard for relatively prolonged periods the development of rancidity in margarine and butter.

Another object of this invention is to extend the range of utility of margarine by increasing the ease with which it may be used in cooking and baking under a wide variety of conditions.

As described in the copending application S. N. 747,848, margarine, containing as it does aqueous and oleaginous components, sometimes develops a moisture film or moisture droplets on the outside thereof. This leakage of moisture results in underweight prints, increases the danger of bacterial and mold growth and materially affects the salability of the margarine. In addition, rancidity sometimes develops in margarine which also materially affects the salability of the product.

In accordance with this invention, margarine is produced which has high moisture-retaining properties, which does not manifest leakage or weeping and in which rancidity is materially retarded. In addition, the margarine of this invention may be utilized for a wide variety of culinary uses. When used as a component for the preparation of baked products, the margarine of this invention yields a batter which is a substantially tight emulsion and which is relatively easy to prepare with a minimum of mixing. The resulting baked product properly prepared with the margarine of this invention has good eating qualities, is of pleasing appearance, has firmness and fineness of grain and in particular has the desired volume.

The margarine of this invention has incorporated therein a mixture of mono-alkyl, di-alkyl and tri-alkyl citrates or a mixture of mono-alkylene, di-alkylene and tri-alkylene citrates. The alkyl or alkylene group in these citrates has at least 14 carbon atoms, and preferably at least 16 carbon atoms. Certain mixtures of alkylene citrates may be unsatisfactory from a taste standpoint, particularly some prepared from alcohols derived from certain animal sources. In addition, the margarine contains an aliphatic mono-carboxylic acid mono-ester of glycerol or a mono-carboxylic acid di-ester of glycerol or both. The mono-carboxylic acid residue in the mono- or di-ester of glycerol desirably has at least 14 carbon atoms, and preferably at least 16 carbon atoms. From the standpoint of emulsifying action, mono- or di-esters of glycerol may be used in which the carboxylic acid residue has less than 14 carbon atoms, but the use of such esters is often undesirable from a flavor standpoint. Desirably, the amount of the mixture of alkyl citrates or alkylene citrates is within the range of ¼ to 2%, and preferably ¼ to ¾% on the weight of the margarine. The amount of such mono-, di- and tri-esters of citric acid in the margarine is desirably 0.05 to to 0.3% and preferably 0.05 to 0.1% of mono-aliphatic citrate, 0.1 to 1.8% and preferably 0.1 to 0.6% of di-aliphatic citrate, and 0.1 to 1.8% and preferably 0.1 to 0.6% of tri-aliphatic citrate.

The amount of aliphatic mono-carboxylic acid mono-ester of glycerol incorporated in the margarine is desirably ¼ to 6% and preferably ½ to 3%, while the amount of di-ester of glycerol incorporated is desirably 1 to 15% and preferably 6 to 12%. Mono-carboxylic acid mono-esters and di-esters of glycerol are ordinarily prepared in mixtures containing both esters. Since both the mono-ester and the di-esters of glycerol are effective to achieve the new result of this invention, the incorporation of such a mixture of both mono- and di-esters of glycerol in margarine is a convenient way of obtaining that result. However, from a quantitative standpoint, the di-esters of glycerol are less than one-half as effective as the mono-esters of glycerol, and that fact must be considered in calculating the total amount of glycerol esters to be incorporated in the margarine when such a mixture is employed.

The mono-carboxylic acid mono-ester of glycerol or the mono-carboxylic acid di-ester of glycerol may be esters of a single mono-carboxylic acid or a plurality of mono-carboxylic acids having at least 14 carbon atoms and preferably having at least 16 carbon atoms. For example, mono-stearoyl glyceride may be incorporated in the margarine, or, again, a mixture of monostearoyl glyceride and mono-palmitoyl glyceride may be used.

It is also advantageous to incorporate in the margarine with the mixture of mono-, di- and tri-aliphatic citrates together with mono-carboxylic acid mono- or di-esters of glycerol, 0.05 to ½% and preferably 0.1 to 0.3% of commercial vegetable phosphatides, such as soya bean lecithin or corn lecithin. These commercial vegetable phosphatides contain about 55 to 65% of total phosphatides. The amount of phosphorus as phosphatides in these commercial vegetable phosphatides is 2.2 to 2.5%.

While the presence of mono-alkyl or mono-alkylene citrate in which the alkyl or alkylene group has at least 14 carbon atoms materially retards the rancidity of margarine, retardation is sometimes more easily achieved by incorporating in the margarine oil immediately after deodorization 0.002 to 0.1% of a mono-alkyl or mono-alkylene citrate in which the alkyl or alkylene group has not more than 12 carbon atoms. The amount of such lower mono-aliphatic citrate desirably incorporated in the margarine oil to achieve a given degree of flavor stability and retardation of rancidity depends upon the molecular weight of the mono-aliphatic citrate, lesser quantities being required for lower molecular weight citrates. With lower molecular weight mono-aliphatic citrates, such as monomethyl, mono-ethyl, mono-isopropyl and mono-allyl citrate, it is advantageous to initially dissolve such mono-aliphatic citrates in a solubilizing or coupling agent and add the resulting solution to the oil. By the use of such coupling agents or dispersing aids, the low molecular weight citrates are dispersed uniformly throughout the margarine oil. This addition of the lower mono-aliphatic citrate may be made in the production of margarine substantially prior to the addition of the mixture of the higher mono-aliphatic, di-aliphatic and tri-aliphatic citrates having aliphatic groups of at least 14 carbon atoms.

The mixture of mono-, di- and tri-aliphatic citrates together with the mono-carboxylic acid mono-esters of glycerol or the mono-carboxylic acid di-esters of glycerol may be incorporated in the margarine at any stage of its preparation or in the deodorized fat prior to the use of the fat in the production of margarine. To insure protection of the fat or margarine oil from flavor stability and rancidity standpoints, it is advantageous to add the mixture of the mono-, di- and tri-aliphatic citrates to the fat shortly after the deodorization of the fat since the fat starts to deteriorate immediately upon completion of the deodorization. Alternatively, if desired, about 0.002 to 0.1% of a mono-aliphatic citrate with an alkyl or alkylene group having not more than 12 carbon atoms may be added immediately after deodorization, and the mixture of mono-aliphatic, di-aliphatic and tri-aliphatic citrates with an alkyl or alkylene group having at least 14 carbon atoms may then be added at any subsequent stage of the process. However, the mixture of mono-aliphatic, di-aliphatic and tri-aliphatic citrates in which the alkyl or alkylene group has at least 14 carbon atoms and the mono-carboxylic acid mono- or di-esters may be added at any other stage in the process, such as in the churning step, depending upon the particular sequence of processing steps employed.

It is desirable, however, that the mixture of mono-, di- and tri-aliphatic citrates be added subsequent to the deodorization of the fat since a major portion of the esters of citric acid is rendered ineffective by the deodorization step.

Since the mono-aliphatic, di-aliphatic and tri-aliphatic citrates are desirably all incorporated in the margarine, it is advantageous to prepare a mixture of all three esters simultaneously. The mixture of mono-, di- and tri-aliphatic citrates may be prepared by the esterification of citric acid and an alcohol, such as a mono-alkyl or mono-alkylene primary or secondary alcohol, preferably by reacting the citric acid and the alcohol in proportions which favor the formation of the mono-, di- and tri-aliphatic citrates in the ratio desired in the mixture. The esterification may be conducted by any of the well-known methods employed for the production of esters and the mono-, di- and tri-aliphatic citrates in the resulting reaction mixture may, if desired, be separated from each other by any suitable method, such as fractional crystallization or selective extraction with a suitable solvent. However, for most purposes, the reaction product may be used as such if it contains the mono-, di- and tri-aliphatic citrates in the proportions desired in the mixture.

Examples of the mono-, di- and tri-aliphatic citrates comprising the mixture which is incorporated in the margarine are the citric acid esters of the following alcohols: tetradecanols, hexadecanols, octadecanols, eicosanols, docosanols, tetradecenols, hexadecenols, octadecenols, eicosenols and docosenols.

Examples of the mono-aliphatic citrates in which the alkyl or alkylene group has not more than 12 carbon atoms are the citric acid esters of methanol, ethanol, propanols, hexanols, octanols, propenols, hexenols and octenols.

Examples of aliphatic mono-carboxylic acid mono-esters of glycerol and aliphatic mono-carboxylic acid di-esters of glycerol which may be incorporated in the margarine are the mono- and di-esters of glycerol of the following fatty acids: oleic, myristic, palmitic and stearic acids.

Examples of the solubilizing or coupling agents which may be employed are saturated monohydric alcohols having at least 6 carbon atoms, such as 2-ethyl-hexyl alcohol, n-octyl alcohol, stearyl alcohol, cetyl alcohol and myristyl alcohol, and mono-carboxylic aliphatic acids having at least 10 carbon atoms, such as stearic acid, palmitic acid, oleic acid, lauric acid and myristic acid.

The mixture of mono-aliphatic, di-aliphatic and tri-aliphatic citrates may be produced from a single alkyl or alkylene alcohol having at least 14 carbon atoms and preferably 16 carbon atoms, or it may be produced from a plurality of such aliphatic alcohols. For example, it may be to an advantage in some cases to incorporate in the margarine a mixture of stearyl and palmityl citrates or, again, a mixture of stearyl and oleyl citrates.

A more comprehensive understanding of this invention is obtained by reference to the following examples:

*Example 1.—Margarine containing stearyl citrates and stearoyl glycerides*

Mono-stearyl, di-stearyl and tri-stearyl citrates are incorporated in margarine by dissolving a mixture of mono-stearyl citrate, di-stearyl citrate and tri-stearyl citrate in a small quantity of the hydrogenated and deodorized oil employed for the margarine, and adding that solution of the stearyl citrates to the body of the hydrogenated and deodorized margarine. For example, 5 lbs. of a mixture of mono-stearyl citrate, di-stearyl citrate and tri-stearyl citrate, prepared as later described, are added at 145° F. to about 10 lbs. of a hydrogenated and deodorized margarine oil comprising about 75% cottonseed oil and about 25% soya bean oil. This solution of the mixture of stearyl citrates is added at a temperature of about 110° F. to about 730 lbs. of hydrogenated and deodorized margarine oil comprising about 75% cottonseed oil and about 25% of soya bean oil and including about 2 lbs. of commercial soya bean lecithin and a minor quantity of the other usual constituents of margarine oil, such as vitamins. An agitator is provided in the tank to insure the uniform incorporation of the stearyl citrates throughout the body of the oil. A mixture of mono-stearoyl glyceride and di-stearoyl glyceride is also incorporated in the margarine oil by initially dissolving 30 lbs. of a mixture containing about 50% mono-stearoyl glyceride and about 50% di-stearoyl glyceride in about 60 lbs. of the hydrogenated and deodorized oil employed for the margarine. The solution of the mixture of mono- and di-stearoyl glycerides in the small quantity of margarine oil is then added to the body of the oil whereby the mono- and di-stearoyl glycerides are incorporated substantially uniformly throughout the body of the oil. This body of margarine oil containing the stearyl citrates and the stearoyl glycerides is thoroughly mixed or churned with about 170 lbs. of cultured milk in accordance with the customary practice of margarine manufacture. During the mixing or churning and preferably toward the end of the churning, about 30 lbs. of salt are added. The resulting mixture is then chilled by any suitable means such as passage over chilled steel rolls or through ice water or through an internal chilling unit. The chilled emulsion is kneaded into a mass, formed into prints and packaged.

The mixture of mono-, di- and tri-stearyl citrates is prepared as follows:

12.1 kilograms of citric acid mono-hydrate are added to 30 kilograms of commercial stearyl alcohol (containing some palmityl alcohol) which is previously melted. During the addition, the mixture is agitated. The mixture is held at 150° C. under reduced pressure for a period of 1½ hours. At the end of this period, boiling and foaming cease substantially. The resulting product which consists of a mixture of about 10 to 15% mono-stearyl citrate, about 50% di-stearyl citrate and the remainder tri-stearyl citrate together with a quantity of mono-, di- and tri-palmityl citrates has an acid value of about 83, a saponification value of about 249, a melting point of about 51 to 68° C. and a color on the Lovibond scale of about 35Y-5.8R.

*Example 2.—Margarine containing myristyl citrates and myristin glycerides*

About 46 pounds of a mixture containing about 60% of mono-myristin and about 40% di-myristin are added to 770 lbs. of hydrogenated and deodorized margarine oil containing about 75% cottonseed oil and about 25% soya bean oil and including about 3 lbs. of lecithin and a minor quantity of the other usual constituents of margarine oil, such as vitamins, and the oil is agitated to insure the uniform distribution of the mono-myristin and di-myristin. The resulting product is thoroughly mixed or churned with about 150 lbs. of cultured milk. During the mixing or churning, and preferably toward the end of the churning, about 30 lbs. of salt are added. The churned mixture of oil and milk is sprayed into a vat of ice water. The chilled product is collected and worked mechanically or kneaded to remove entrapped ice water. This working may be performed on a large, round revolving table with a corrugated wooden kneading roll. During the working, a water paste prepared by thoroughly mixing about 8 lbs. of water and about 7.5 lbs. of a mixture of mono-myristyl citrate, di-myristyl citrate and tri-myristyl citrate is thoroughly incorporated in the mass of the chilled, churned margarine. The worked mass is then formed into prints and packaged.

The mixture of mono-myristyl citrate, di-myristyl citrate and tri-myristyl citrate is prepared in a manner similar to that described in Example 1 for the preparation of the mixed stearyl citrates, except that 69 lbs. of myristyl alcohol are used instead of 30 kilograms of commercial stearyl alcohol and 31 lbs. of anhydrous citric acid are employed instead of 12.1 kilograms of citric acid mono-hydrate. The acid value of the mixture, which contains about 10 to 15% mono-myristyl citrate, about 50% di-myristyl citrate and the remainder tri-myristyl citrate is 98.9 and the saponification value is 291.0.

*Example 3.—Margarine containing palmityl citrates and mono- and di-glycerides prepared for margarine oil*

To about 720 lbs. of hydrogenated and deodorized margarine oil containing about 75% cottonseed oil, about 15% soya bean oil and about 10% peanut oil are added 2 lbs. of lecithin and a minor quantity of the other usual constituents of margarine oil, such as vitamins. To this body of oil are also added 4 lbs. of a mixture of mono-palmityl citrate, di-palmityl citrate and tri-palmityl citrate, previously dissolved at about 145° F. in the same amount of margarine oil. This solution of the mixture of palmityl citrates is added at a temperature of about 110° F. to the body of the oil, and the oil is agitated to insure the uniform distribution of the palmityl citrates. A mixture of mono- and di-glycerides derived from the margarine oil is then added to the body of the oil, and preferably this mixture of mono- and di-glycerides is dissolved in a portion of margarine oil prior to addition to the oil. The mixture of mono- and di-glycerides contains about 50% of mono-glycerides and about 50% of di-glycerides. The solution of these glycerides is prepared by dissolving 60 lbs. of the mixture of mono- and di-glycerides of the margarine oil in about 30 lbs. of the hydrogenated and deodorized oil employed for the margarine. After the addition of the solution of the mono- and di-glycerides, the body of the oil is agitated to insure the uniform distribution of the glycerides. The body of the margarine oil is then thoroughly mixed or churned with about 155 lbs. of cultured milk in accordance with the customary practice of margarine manufacture. During the mixing or churning, about 30 lbs. of salt are added. The resulting mixture is then chilled by any suitable means, and the chilled emulsion is kneaded into a mass, formed into prints and packaged.

The mixture of mono-, di- and tri-palmityl citrates is prepared in a manner similar to that described in example 1 for the preparation of the mixed stearyl citrates, except that 71.5 lbs. of cetyl alcohol are used instead of 30 kilograms of commercial stearyl alcohol and 28.5 lbs. of anhydrous citric acid are used instead of 12.1 kilograms of citric acid monohydrate. The acid value of the mixture, containing about 20% mono-palmityl citrate, about 50% di-palmityl citrate and the remainder tri-palmityl citrate is 91.8 and the saponification value is 272.1.

*Example 4.—Margarine containing oleyl citrates and di-stearoyl glyceride together with a small quantity of mono-isopropyl citrate*

About 6 lbs. of a mixture of mono-oleyl citrate di-oleyl citrate and tri-oleyl citrate are added at a temperature of about 110° F. to about 700 lbs. of a margarine oil containing about 60% cottonseed oil and about 40% soya bean oil. The mixture of oleyl citrates contains about 10% mono-oleyl citrate, about 70% di-oleyl citrate and the remainder tri-oleyl citrate. There is also added to the oil 0.3 lbs. of a mixture of isopropyl citrates dissolved in 0.5 lbs. of a mixture of 50% mono-stearoyl glycerides and about 50% di-stearoyl glycerides. The mixture of isopropyl citrates contained about 90% mono-isopropyl citrate and about 10% of di-isopropyl citrate. The body of the oil is desirably agitated to insure the uniform distribution of the oleyl and isopropyl citrates. The addition of the mixture of oleyl citrates and isopropyl citrates may be made in the storage tank, if desired, at any time prior to the pumping of the margarine oil to the churn or mixer. About 100 lbs. of di-stearoyl glyceride are then incorporated in the oil maintained at a temperature of about 140° F. The margarine oil containing the oleyl citrates, isopropyl citrates and di-stearoyl glyceride is then mixed or churned with about 170 lbs. of cultured milk. During the churning, about 30 lbs. of salt are added. The resulting mixture is then chilled, kneaded, formed into prints and packaged.

The mixture of mono-oleyl citrate, di-oleyl citrate and tri-oleyl citrate is prepared in a manner similar to that described in Example 1 for the preparation of the mixed stearyl citrates, except that 55 lbs. of commercial oleyl alcohol are used instead of 30 kilograms of commercial stearyl alcohol and 19.8 lbs. of anhydrous citric acid are employed instead of 12.1 kilograms of citric acid monohydrate. The acid value of the product is 68.3 and the saponification value is 241.9.

The mono-isopropyl citrate is prepared as follows:

Equal parts of U. S. P. citric acid and anhydrous isopropyl alcohol are heated together under reflux, without catalyst for 118 hours at 92° C., after which time the acid value of the reaction mixture is found to be about 203.6 and the saponification value 392 (one-half esterified). The alcohol and the water of reaction are removed by low temperature evaporation in vacuo.

The residue is taken up with ethyl ether and then thrown out of the ether solution by the addition of a quantity of low-boiling petroleum ether just sufficient to form a precipitate. The precipitate or oily residue is again taken up with ethyl ether and the precipitation with low-boiling petroleum ether repeated. This procedure is repeated several times. After final removal of solvent by heating with stirring to 130° C., a typical analysis is:

|  | Found | Calc'd |
|---|---|---|
| Acid Value | 454 | 480 |
| Saponification Value | 709 | 720 |

*Example 5.—Margarine containing oleyl citrates, stearyl citrates and stearoyl glycerides*

About 5 lbs. of a mixture of mono-oleyl citrate, di-oleyl citrate, tri-oleyl citrate, mono-stearyl citrate, di-stearyl citrate and tri-stearyl citrate together with the mixed citric acid esters of oleyl and stearyl alcohols are added at 145° F. to about 10 lbs. of hydrogenated and deodorized oleo oil. This solution of the mixture of oleyl and stearyl citrates is added at a temperature of about 110° F. to about 740 lbs. of deodorized oleo oil hydrogenated to the desired consistency for margarine manufacture and including about 3 lbs. of commercial soya bean lecithin and a minor quantity of the other usual constituents of margarine oil. About 40 lbs. of a mixture containing about 50% mono-stearoyl glyceride and about 50% di-stearoyl glyceride dissolved in about 40 lbs. of the hydrogenated oleo oil is also added to the margarine oil. The body of the oil is agitated to insure the uniform distribution of the citric acid esters and mono- and di-glycerides. The body of the margarine oil containing the citric acid esters and the stearoyl glycerides is then thoroughly mixed or churned with about 170 lbs. of cultured milk. During the churning, about 30 lbs. of salt are added. The resulting mixture is then chilled by any suitable means, kneaded into a mass, formed into prints and packaged.

The mixture of oleyl citrates and stearyl citrates is prepared as follows:

A mixture of 134 grams of commercial oleyl alcohol and 134 grams of commercial stearyl alcohol are melted. To this mixture is added 106.7 pounds of U. S. P. citric acid. During the addition, the mixture is agitated. The mixture is heated and held for a period of 1½ hours at 155° C. under reduced pressure. At the end of this period, boiling and foaming cease substantially. The mixture, which contains the di-stearyl citrate, di-oleyl citrate and their corresponding mono- and tri-esters together with mixed esters containing both stearyl and oleyl groups, has an acid value of 79.4 and a saponification value of 249.2.

The mixture contains about 20% of the mono-esters of citric acid, about 50% of the di-esters of citric acid and the remainder the tri-esters of citric acid.

The terms and expressions which we have employed are used as terms of description and not of limitation, and we have no intention, in the use of such terms and expressions, of excluding any equivalents of the features described or portions thereof, but recognize that various modifications are possible within the scope of the invention claimed.

What is claimed is:

1. A margarine containing oleaginous and aqueous components and having incorporated therein ¼ to 2% of a mixture of a mono-aliphatic citrate, a di-aliphatic citrate and a tri-aliphatic citrate, in which the aliphatic groups in said citrates have at least 14 carbon atoms and are selected from the class constituting of alkyl groups and alkylene groups, and ¼ to 6% of aliphatic mono-carboxylic acid mono-esters of glycerol in which the carboxylic acid residue has at least 14 carbon atoms, the amount of said mono-aliphatic, di-aliphatic and tri-aliphatic citrates in said margarine being 0.05 to 0.3% of mono-aliphatic citrate, 0.1 to 1.8% of di-aliphatic citrate and 0.1 to 1.8% of trialiphatic citrate.

2. A margarine containing oleaginous and aqueous components and having incorporated therein ¼ to 2% of a mixture of a mono-aliphatic citrate, a di-aliphatic citrate and a tri-aliphatic citrate, in which the aliphatic groups in said citrates have at least 14 carbon atoms and are selected from the class consisting of alkyl groups and alkylene groups, and 1 to 15% of aliphatic mono-carboxylic acid di-esters of glycerol in which the carboxylic acid residue has at least 14 carbon atoms, the amount of said mono-aliphatic, di-aliphatic and tri-aliphatic citrates in said margarine being 0.05 to 0.3% of mono-aliphatic citrate, 0.1 to 1.8% of di-aliphatic citrate and 0.1 to 1.8% of tri-aliphatic citrate.

3. A margarine containing oleaginous and aqueous components and having incorporated therein ¼ to ¾% of a mixture of a monoaliphatic citrate a di-aliphatic citrate and a tri-aliphatic citrate, in which the aliphatic groups in said citrates have at least 16 carbon atoms and are selected from the class consisting of alkyl groups and alkylene groups, and ½ to 3% of aliphatic mono-carboxylic acid mono-esters of glycerol in which the mono-carboxylic acid residue has at least 16 carbon atoms, the amount of said mono-aliphatic, di-aliphatic and tri-aliphatic citrates in said margarine being 0.05 to 0.1% of mono-aliphatic citrate, 0.1 to 0.6% of di-aliphatic citrate and 0.1 to 0.6% of tri-aliphatic citrate.

4. A margarine containing oleaginous and aqueous components and having incorporated therein ¼ to ¾% of a mixture of a mono-aliphatic citrate, a di-aliphatic citrate and a tri-aliphatic citrate, in which the aliphatic groups in said citrates have at least 16 carbon atoms and are selected from the class consisting of alkyl groups and alkylene groups, and 6 to 12% of aliphatic mono-carboxylic acid di-esters of glycerol in which the carboxylic acid residue has at least 16 carbon atoms, the amount of said mono-aliphatic, di-aliphatic and tri-aliphatic citrates in said margarine being 0.05 to 0.1% of mono-aliphatic citrate, 0.1 to 0.6% of di-aliphatic citrate and 0.1 to 0.6% of tri-aliphatic citrate.

5. A margarine containing oleaginous and aqueous components and having incorporated therein ¼ to 2% of a mixture of a mono-aliphatic citrate, a di-aliphatic citrate and a tri-aliphatic citrate, in which the aliphatic groups in said citrates have at least 14 carbon atoms and are selected from the class consisting of alkyl groups and alkylene groups, the amount of said mono-aliphatic, di-aliphatic and tri-aliphatic citrates in said margarine being 0.05 to 0.3% of mono-aliphatic citrate, 0.1 to 1.8% of di-aliphatic citrate and 0.1 to 1.8% of tri-aliphatic citrate, ¼ to 6% of aliphatic mono-carboxylic acid mono-esters of glycerol in which the carboxylic acid residue has at least 14 carbon atoms and 0.002 to 0.1% of a mono-aliphatic ester of citric acid selected from the class consisting of mono-alkyl citrates in which the alkyl group has not more than 12 carbon atoms and mono-alkylene groups in which the alkylene group has not more than 12 carbon atoms.

6. A margarine containing oleaginous and aqueous components and having incorporated therein ¼ to 2% of a mixture of a mono-aliphatic citrate, a di-aliphatic citrate and a tri-aliphatic citrate, in which the aliphatic groups in said citrates have at least 14 carbon atoms and are selected from the class consisting of alkyl groups and alkylene groups, the amount of said mono-aliphatic, di-aliphatic and tri-aliphatic citrates in said margarine being 0.05 to 0.3% of mono-aliphatic citrate, 0.1 to 1.8% of di-aliphatic citrate and 0.1 to 1.8% of tri-aliphatic citrate, 1 to 15% of aliphatic mono-carboxylic acid di-esters of glycerol in which the carboxylic acid residue has at least 14 carbon atoms and 0.002 to 0.1% of a mono-aliphatic ester of citric acid selected from the class consisting of mono-alkyl citrates in which the alkyl group has not more than 12 carbon atoms and mono-alkylene groups in which the alkylene group has not more than 12 carbon atoms.

7. The method of producing margarine containing oleaginous and aqueous components, said method comprising incorporating in margarine ¼ to 2% of a mixture of a mono-aliphatic citrate, a di-aliphatic citrate and a tri-aliphatic citrate, in which the aliphatic groups in said citrates have at least 14 carbon atoms and are selected from the class consisting of alkyl groups and alkylene groups, and ¼ to 6% of aliphatic mono-carboxylic acid mono-esters of glycerol in which the carboxylic acid residue has at least 14 carbon atoms, the amount of said mono-aliphatic, di-aliphatic and tri-aliphatic citrates incorporated in the margarine being 0.05 to 0.3% of mono-aliphatic citrate, 0.1 to 1.8% of di-aliphatic citrate and 0.1 to 1.8% of tri-aliphatic citrate.

8. The method of producing margarine containing oleaginous and aqueous components, said method comprising incorporating in margarine ¼ to 2% of a mixture of a mono-aliphatic citrate, a di-aliphatic citrate and a tri-aliphatic citrate, in which the aliphatic groups in said citrates have at least 14 carbon atoms and are selected from the class consisting of alkyl groups and alkylene groups, and 1 to 15% of aliphatic mono-carboxylic acid di-esters of glycerol in which the carboxylic acid residue has at least 14 carbon atoms, the amount of said mono-aliphatic, di-aliphatic and tri-aliphatic citrates incorporated in said margarine being 0.05 to 0.3% of mono-aliphatic citrate, 0.1 to 1.8% of di-aliphatic citrate and 0.1 to 1.8% of tri-aliphatic citrate.

9. The method of producing margarine containing oleaginous and aqueous components, said method comprising incorporating in margarine ¼ to ¾% of a mixture of a mono-aliphatic citrate, a di-aliphatic citrate and a tri-aliphatic citrate, in which the aliphatic groups in said citrates have at least 16 carbon atoms and are selected from the class consisting of alkyl groups and alkylene groups, and ½ to 3% of aliphatic mono-carboxylic acid mono-esters of glycerol in which the mono-carboxylic acid residue has at least 16 carbon atoms, the amount of said mono-aliphatic, di-aliphatic and tri-aliphatic citrates incorporated in the margarine being 0.05 to 0.1% of mono-aliphatic citrate, 0.1 to 0.6% of di-aliphatic citrate and 0.1 to 0.6% of tri-aliphatic citrate.

10. The method of producing margarine containing oleaginous and aqueous components, said method comprising incorporating in margarine ¼ to ¾% of a mixture of a mono-aliphatic citrate, a di-aliphatic citrate and a tri-aliphatic citrate, in which the aliphatic groups in said citrates have at least 16 carbon atoms and are selected from the class consisting of alkyl groups and alkylene groups, and 6 to 12% of aliphatic mono-carboxylic acid di-esters of glycerol in which the carboxylic acid residue has at least 16 carbon atoms, the amount of said mono-aliphatic, di-aliphatic and tri-aliphatic citrates incorporated in said margarine being 0.05 to 0.1% of mono-aliphatic citrate, 0.1 to 0.6% of di-aliphatic citrate and 0.1 to 0.6% of tri-aliphatic citrate.

11. A margarine containing oleaginous and aqueous components and having incorporated therein ¼ to 2% of a mixture of a mono-aliphatic citrate, a di-aliphatic citrate and a tri-aliphatic citrate, in which the aliphatic groups in said citrates have at least 14 carbon atoms and are selected from the class consisting of alkyl groups and alkylene groups, and an amount of a member selected from the class consisting of ¼ to 6% of aliphatic mono-carboxylic acid mono-esters of glycerol in which the carboxylic acid residue has at least 14 carbon atoms and 1 to 15% of aliphatic mono-carboxylic acid di-esters of glycerol, in which the mono-carboxylic acid residue has at least 14 carbon atoms, the amount of said mono-aliphatic, di-aliphatic and tri-aliphatic citrates in said margarine being 0.05 to 0.3% of mono-aliphatic citrate, 0.1 to 1.8% of di-aliphatic citrate, and 0.1 to 1.8% of tri-aliphatic citrate.

12. The method of producing margarine containing oleaginous and aqueous components, said method comprising incorporating in said margarine ¼ to 2% of a mixture of a mono-aliphatic citrate, a di-aliphatic citrate and a tri-aliphatic citrate in which the aliphatic groups in said citrates have at least 14 carbon atoms and are selected from the class consisting of alkyl groups and alkylene groups and an amount of a member selected from the class consisting of ¼ to 6% of aliphatic mono-carboxylic acid mono-esters of glycerol in which the carboxylic acid residue has at least 14 carbon atoms and 1 to 15% of aliphatic mono-carboxylic acid di-esters of glycerol in which the mono-carboxylic acid residue has at least 14 carbon atoms, the amount of said mono-aliphatic, di-aliphatic and tri-aliphatic citrates incorporated in said margarine being 0.05 to 0.3% of mono-aliphatic citrate, 0.1 to 1.8% of di-aliphatic citrate and 0.1 to 1.8% of tri-aliphatic citrate.

CHESTER M. GOODING.
HANS W. VAHLTEICH.
ETHEL NEAL,
Administratrix of the Estate of Ralph H. Neal, deceased

REFERENCES CITED

The following references are of record in the file of this patent:

UNITED STATES PATENTS

| Number | Name | Date |
|---|---|---|
| 1,985,496 | Harris | Dec. 25, 1934 |

OTHER REFERENCES

Bulletin No. 10, The Composition & Food Value of Margarine, National Association of Margarine Mfgrs. Washington 4, D. C., page 2.